(12) United States Patent
Frechette et al.

(10) Patent No.: US 10,852,034 B2
(45) Date of Patent: Dec. 1, 2020

(54) HIGH EFFICIENCY FLUID HEATING SYSTEM EXHAUST MANIFOLD

(71) Applicant: Fulton Group N.A., Inc., Pulaski, NY (US)

(72) Inventors: Alexander Thomas Frechette, Mexico, NY (US); Carl Nicholas Nett, Sandisfield, MA (US); Richard James Snyder, Mexico, NY (US); Thomas William Tighe, Pulaski, NY (US); Keith Richard Waltz, Sandy Creek, NY (US)

(73) Assignee: FULTON GROUP N.A., INC., Pulaski, NY (US)

( * ) Notice: Subject to any disclaimer, the term of this patent is extended or adjusted under 35 U.S.C. 154(b) by 36 days.

(21) Appl. No.: 15/872,957

(22) Filed: Jan. 16, 2018

(65) Prior Publication Data

US 2018/0142918 A1    May 24, 2018

Related U.S. Application Data

(63) Continuation-in-part of application No. PCT/US2016/042035, filed on Jul. 13, 2016.
(Continued)

(51) Int. Cl.
*F24H 1/28* (2006.01)
*F24H 9/00* (2006.01)
(Continued)

(52) U.S. Cl.
CPC ........... *F24H 1/287* (2013.01); *F24H 9/0015* (2013.01); *F28D 7/16* (2013.01); *F28D 21/0007* (2013.01);
(Continued)

(58) Field of Classification Search
CPC ..................................................... F24H 1/287
See application file for complete search history.

(56) References Cited

U.S. PATENT DOCUMENTS 1,871,322 A      8/1932  Hodgins
2,680,600 A  *   6/1954  Rothemund .......... F28D 7/1607
                                                            165/82
(Continued)

FOREIGN PATENT DOCUMENTS

DE   10 2012 111 961 A1    6/2014
EP        1 048 343 A2    11/2000
(Continued)

OTHER PUBLICATIONS

International Search Report for International Application No. PCT/US2016/043861 dated Nov. 2, 2016.
(Continued)

*Primary Examiner* — Nathaniel Herzfeld
(74) *Attorney, Agent, or Firm* — McCormick, Paulding & Huber PLLC

(57) ABSTRACT

A fluid heating system including: a pressure vessel shell com including prising a first inlet; a heat exchanger disposed in the pressure vessel shell, the heat exchanger including a second inlet and a second outlet, wherein the second inlet of the heat exchanger is connected to the first inlet of the pressure vessel shell; and an exhaust manifold disposed in the pressure vessel shell, the exhaust manifold including a third inlet and a third outlet, wherein the third inlet of the exhaust manifold is connected to the second outlet of the heat exchanger, wherein the third outlet of the exhaust manifold is outside of the pressure vessel shell, and wherein the exhaust manifold penetrates the pressure vessel shell.

25 Claims, 9 Drawing Sheets

Related U.S. Application Data

(60) Provisional application No. 62/231,662, filed on Jul. 13, 2015.

(51) Int. Cl.
*F28D 7/16* (2006.01)
*F28D 21/00* (2006.01)
*F28F 9/02* (2006.01)
*F28F 9/22* (2006.01)

(52) U.S. Cl.
CPC .... *F28F 9/0229* (2013.01); *F28F 2009/0295* (2013.01); *F28F 2009/226* (2013.01)

(56) References Cited

U.S. PATENT DOCUMENTS

| | | | | |
|---|---|---|---|---|
| 2,938,845 | A * | 5/1960 | Treshow | G21C 1/082 376/374 |
| 3,317,223 | A | 5/1967 | Ingraham et al. | |
| 3,724,878 | A | 4/1973 | Ford | |
| 3,760,870 | A * | 9/1973 | Guetlhuber | B01J 8/067 165/103 |
| 4,127,389 | A * | 11/1978 | Hackemesser | C01B 3/384 422/201 |
| 4,163,473 | A * | 8/1979 | Engelberts | B21C 37/22 165/157 |
| 4,206,802 | A * | 6/1980 | Reed | B01D 53/26 122/483 |
| 4,526,409 | A | 7/1985 | Schaefer | |
| 4,993,367 | A | 2/1991 | Kehrer | |
| 5,746,590 | A | 5/1998 | May et al. | |
| 7,754,163 | B2 * | 7/2010 | Filippi | B01J 8/025 166/145 |
| 8,915,292 | B2 * | 12/2014 | Schatz | F28D 9/0031 165/157 |
| 2005/0287053 | A1 | 12/2005 | Sakai et al. | |
| 2007/0114007 | A1 | 5/2007 | Schindler et al. | |
| 2008/0202724 | A1 | 8/2008 | Lorenz et al. | |
| 2009/0126918 | A1 | 5/2009 | Campagna et al. | |
| 2012/0186780 | A1 | 7/2012 | Ilgner et al. | |
| 2014/0008911 | A1 | 1/2014 | Hartmann et al. | |
| 2014/0090804 | A1 * | 4/2014 | Samz | F28F 27/02 165/81 |
| 2014/0299115 | A1 | 10/2014 | Zhang et al. | |

FOREIGN PATENT DOCUMENTS

| | | |
|---|---|---|
| JP | 2789558 B2 | 8/1998 |
| JP | 2001 108390 A | 4/2001 |
| KR | 20-1989-0011125 U | 7/1989 |
| KR | 10-2010-0117468 A | 11/2010 |
| WO | 2014/128924 A1 | 8/2014 |

OTHER PUBLICATIONS

Written Opinion for International Application No. PCT/US2016/043861 dated Nov. 2, 2016.
International Search Report for International Application No. PCT/US2016/043602 dated Nov. 1, 2016.
Written Opinion for International Application No. PCT/US2016/043602 dated Nov. 1, 2016.
International Search Report for International Application No. PCT/US2016/042035 dated Sep. 12, 2016.
Written Opinion for International Application No. PCT/US2016/042035 dated Sep. 12, 2016.

* cited by examiner

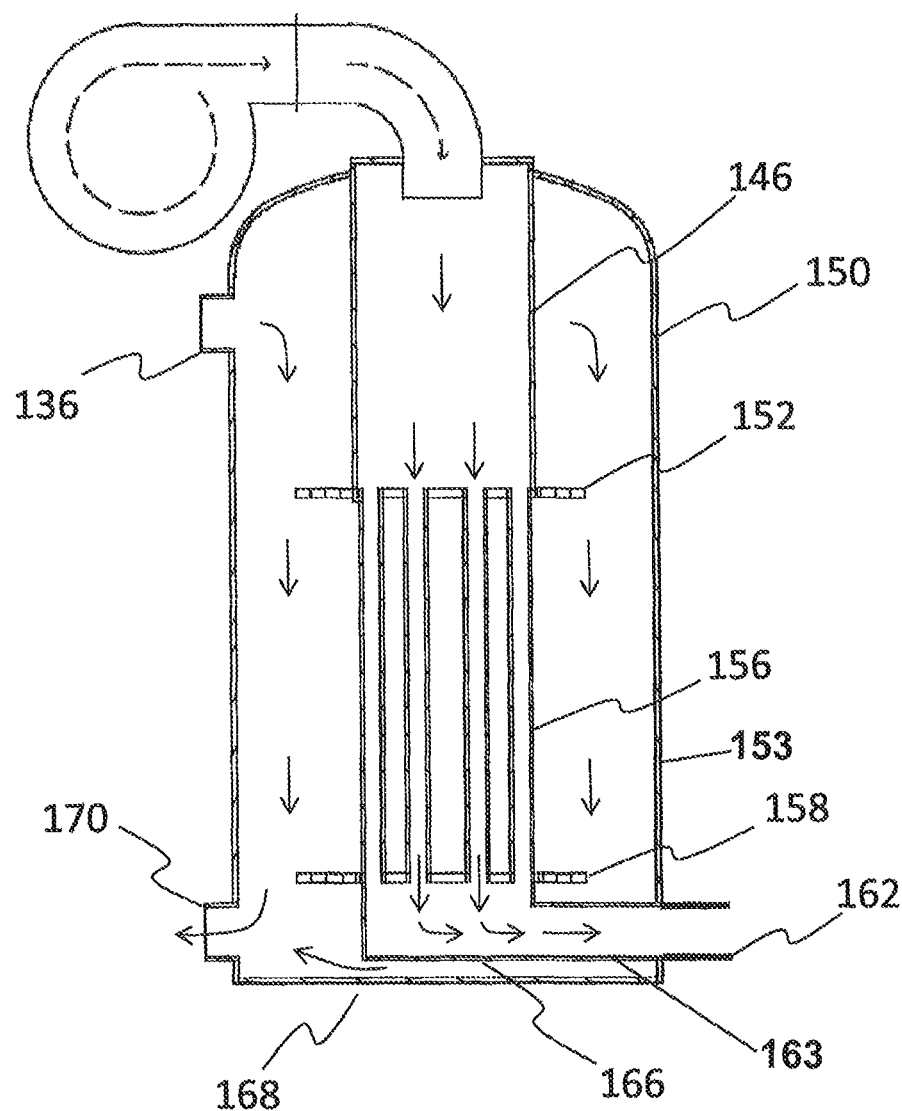

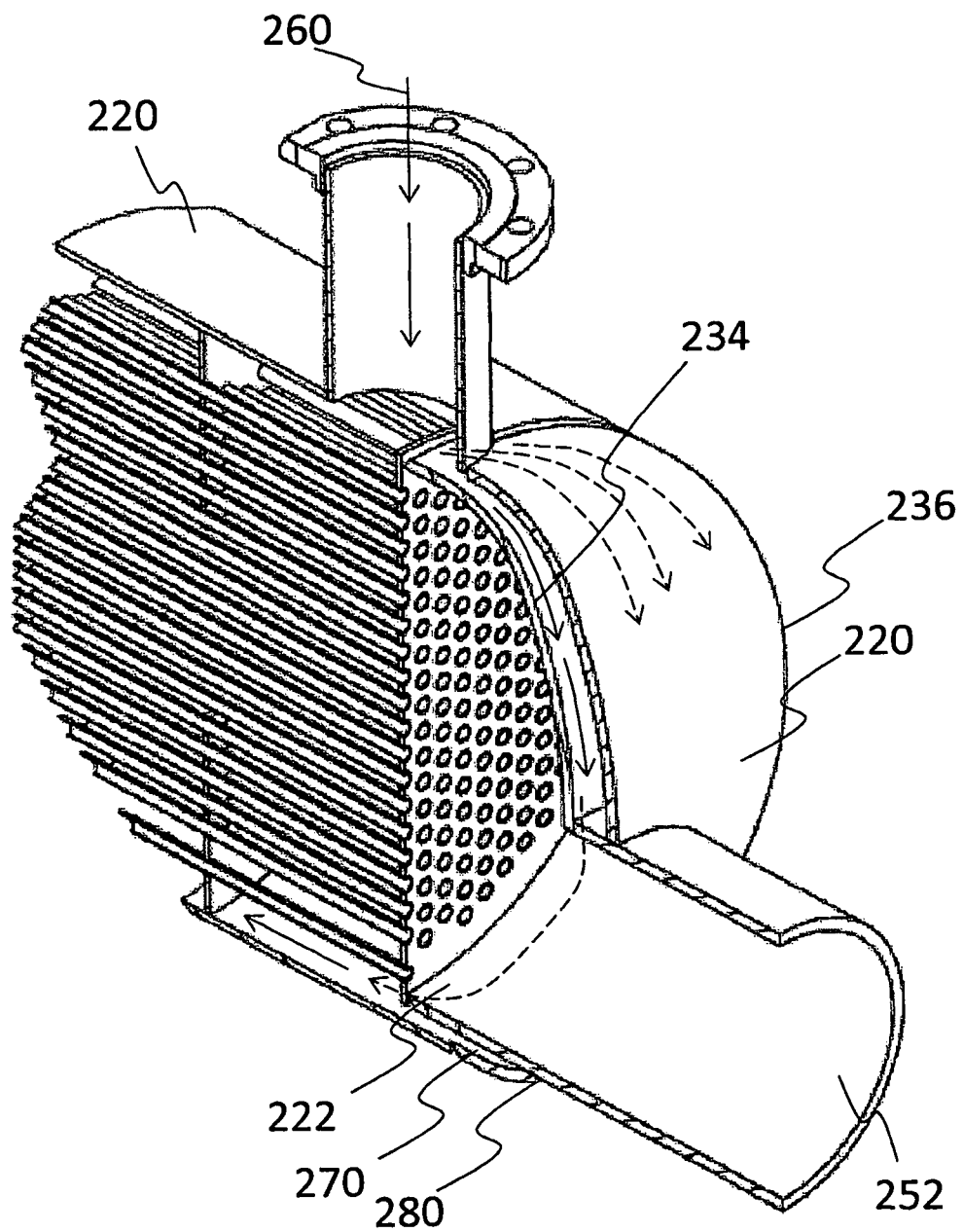

HIGH EFFICIENCY FLUID HEATING SYSTEM EXHAUST MANIFOLD

CROSS-REFERENCE TO RELATED APPLICATION

This application is a continuation in part (CIP) of PCT Application No. PCT/US2016/042035, filed on Jul. 13, 2016, which claims the benefit of U.S. Provisional Patent Application Ser. No. 62/231,662 filed Jul. 13, 2015, and, each of which is incorporated herein by reference in its entirety to the extent permitted by applicable law.

BACKGROUND

(1) Field

This application relates to a fluid heating system, methods of manufacture thereof, methods of using a high efficiency exhaust manifold, and methods of fluid heating.

(2) Description of the Related Art

Fluid heating systems are used to provide a heated production fluid for a variety of commercial, industrial, and domestic applications such as hydronic, steam, and thermal fluid boilers, for example. Because of the desire for improved energy efficiency, compactness, reliability, and cost reduction, there remains a need for improved fluid heating systems, as well as improved methods of manufacture thereof.

Thermal energy loss, which results in a decrease in overall system thermal efficiency, is present through a variety of pathways in fluid heating systems, and is present both in systems that incorporate tube-and shell heat exchangers and those that employ alternative heat exchanger designs, including tubeless heat exchangers. This is particularly true of fluid heating systems for the production of hot water, steam, and thermal fluid for hot liquid or steam for ambient temperature regulation, hot water consumption, or commercial and industrial process applications. Thus there remains a need for an improved fluid heating system having improved thermal efficiency.

SUMMARY

Disclosed herein is a heating system with a high efficiency exhaust manifold.

Also disclosed are methods of manufacturing the heating system incorporating a high efficiency exhaust manifold.

The above described and other features are exemplified by the following figures and detailed description.

Disclosed is a fluid heating system comprising: a pressure vessel shell comprising a first inlet; a heat exchanger disposed in the pressure vessel shell, the heat exchanger comprising a second inlet and a second outlet, wherein the second inlet of the heat exchanger is connected to the first inlet of the pressure vessel shell; and an exhaust manifold disposed in the pressure vessel shell, the exhaust manifold comprising a third inlet and a third outlet, wherein the third inlet of the exhaust manifold is connected to the second outlet of the heat exchanger, wherein the third outlet of the exhaust manifold is outside of the pressure vessel shell, and wherein the exhaust manifold penetrates the pressure vessel shell.

Also disclosed is a fluid heating system comprising: a pressure vessel shell comprising a first inlet; a heat exchanger disposed in the pressure vessel shell, the heat exchanger comprising a second inlet and a second outlet, wherein the second inlet of the heat exchanger is connected to the first inlet of the pressure vessel shell; an exhaust manifold disposed in the pressure vessel shell, the exhaust manifold comprising a third inlet and a third outlet, wherein the third inlet of the exhaust manifold is connected to the second outlet of the heat exchanger; and a conduit, which connects the third outlet of the exhaust manifold to an outside of the pressure vessel shell, and wherein the conduit penetrates the pressure vessel shell.

Also disclosed is a method of heat transfer, the method comprising: providing a fluid heating system comprising a pressure vessel shell comprising a first inlet, a heat exchanger disposed in the pressure vessel shell, the heat exchanger comprising a second inlet and a second outlet, wherein the second inlet of the heat exchanger is connected to the first inlet of the pressure vessel shell, and an exhaust manifold disposed in the pressure vessel shell, the exhaust manifold comprising a third inlet and a third outlet, wherein the third inlet of the exhaust manifold is connected to the second outlet of the heat exchanger, wherein the third outlet of the exhaust manifold is outside of the pressure vessel shell, and wherein the exhaust manifold penetrates the pressure vessel shell; and disposing a thermal transfer fluid in the heat exchanger and exhaust manifold and a production fluid in the pressure vessel shell to transfer heat from the thermal transfer fluid to the production fluid.

Also disclosed is a method of heat transfer, the method comprising: providing a fluid heating system comprising a pressure vessel shell comprising a first inlet, a heat exchanger disposed in the pressure vessel shell, the heat exchanger comprising a second inlet and a second outlet, wherein the second inlet of the heat exchanger is connected to the first inlet of the pressure vessel shell, an exhaust manifold disposed in the pressure vessel shell, the exhaust manifold comprising a third inlet and a third outlet, wherein the third inlet of the exhaust manifold is connected to the second outlet of the heat exchanger, and a conduit, which connects the third outlet of the exhaust manifold to an outside of the pressure vessel shell, and wherein the conduit penetrates the pressure vessel shell; disposing a thermal transfer fluid in the heat exchanger and exhaust manifold and a production fluid in the pressure vessel shell to transfer heat from the thermal transfer fluid to the production fluid.

Also disclosed is a fluid heating system comprising: a pressure vessel shell comprising a first inlet and first outlet, a cylindrical shell, a first top head and a first bottom head, wherein the cylindrical shell is disposed between the first top head and the first bottom head, and wherein the first inlet and the first outlet are each independently on the cylindrical shell, the first top head, or the first bottom head; a heat exchanger disposed in the pressure vessel shell; an outlet member connecting the second outlet to an exhaust flue which is disposed on an outside of the pressure vessel shell; a conduit, which penetrates the pressure vessel shell, wherein a first end of the conduit is connected to the second inlet and wherein a second end of the conduit is on the outside of the pressure vessel shell.

BRIEF DESCRIPTION OF THE DRAWINGS

Referring to the figures, which are exemplary embodiments, and wherein the like elements are numbered alike.

FIG. 1 shows a cross-sectional diagram of an embodiment of a fuel-fired, fire-tube fluid heating system in the vertical orientation in accordance with embodiments of the present disclosure.

FIG. 2B shows a cutaway diagram of an embodiment of an exhaust gas manifold in a fuel-fired, fire-tube fluid heating system in the horizontal orientation in accordance with embodiments of the present disclosure.

DETAILED DESCRIPTION

Figure 2A:
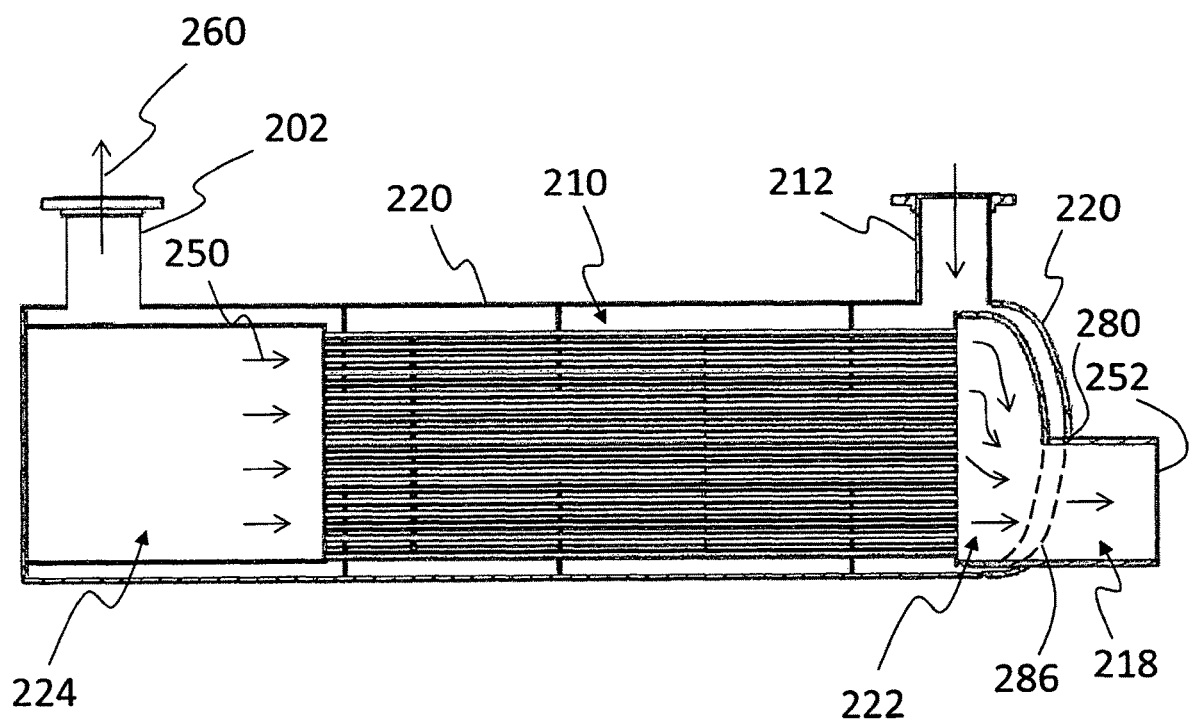
FIG. 2A shows a cross-section diagram of an embodiment of a fuel-fired, fire-tube fluid heating system in the horizontal orientation in accordance with embodiments of the present disclosure.

As further discussed herein, the Applicants have discovered that fluid heating systems that use an exhaust manifold external to a pressure vessel can suffer substantially to energy losses to the ambient air.

Disclosed is an improved fluid heating system which provides improved efficiency by exposing part or all of the exterior surfaces of an exhaust gas manifold to production fluid. Since the interior wall of the exhaust manifold is exposed to combustion gases exiting the heat exchanger and at least a portion of the exterior surface of the exhaust gas manifold is exposed to the production fluid, the temperature differential promotes the transfer of thermal energy. The transfer of thermal energy to the production fluid improves the thermal efficiency of the fluid heating system. Thus, the exhaust manifold becomes a heat exchanging manifold.

Energy losses due to energy transfer from the exhaust manifold can occur in multitubular fluid firetube heating systems and boilers. A preferred embodiment can comprise a shell and tube heat exchanger, where heat from a thermal transfer fluid located in a tube is transferred to a production fluid located in the pressure vessel shell. The heating fluid can be heated in a furnace, from the combustion of a fuel and optionally in the presence of air, steam, or water. The heated heating fluid can travel from the furnace through a tube to an exhaust gas manifold, which is located at a distal end of the tube. An upper tube sheet can be located between the furnace and the tube and a lower tube sheet can be located at an opposite distal end of the tube and between the tube and the exhaust gas manifold. The pressure vessel shell can be fixedly attached to one or more of the furnace, the upper tube sheet, the lower tube sheet, or the exhaust gas manifold. The heat exchanger, and optionally one or both of the furnace and the exhaust gas manifold, can be disposed within the pressure vessel shell.

The fluid heating system may be used to exchange heat between any suitable fluids, e.g., a first fluid and the second fluid, wherein the first and second fluids may each independently be a gas or a liquid. Thus the disclosed fluid heating system may be used as a gas-liquid, liquid-liquid, or gas-gas heat exchanger. In a preferred embodiment the first fluid, which is directed through the heat exchanger core, is a thermal transfer fluid, and may be a combustion gas, e.g., a gas produced by fuel fired combustor, and may comprise water, carbon monoxide, carbon dioxide, or combination thereof. Also, the second fluid, which is directed through the pressure vessel and contacts an entire outer surface of the heat exchanger core, is a production fluid and may comprise water, steam, oil, a thermal fluid (e.g., a thermal oil), or combination thereof. The thermal fluid may comprise water, a C2 to C30 glycol such as ethylene glycol, a unsubstituted or substituted C1 to C30 hydrocarbon such as mineral oil or a halogenated C1 to C30 hydrocarbon wherein the halogenated hydrocarbon may optionally be further substituted, a molten salt such as a molten salt comprising potassium nitrate, sodium nitrate, lithium nitrate, or a combination thereof, a silicone, or a combination thereof. Representative halogenated hydrocarbons include 1,1,1,2-tetrafluoroethane, pentafluoroethane, difluoroethane, 1,3,3,3-tetrafluoropropene, and 2,3,3,3-tetrafluoropropene, e.g., chlorofluorocarbons (CFCs) such as a halogenated fluorocarbon (HFC), a halogenated chlorofluorocarbon (HCFC), a perfluorocarbon (PFC), or a combination thereof. The hydrocarbon may be a substituted or unsubstituted aliphatic hydrocarbon, a substituted or unsubstituted alicyclic hydrocarbon, or a combination thereof. Commercially available examples include Therminol® VP-1, (Solutia Inc.), Diphyl® DT (Bayer A. G.), Dowtherm® A (Dow Chemical) and Therm® S300 (Nippon Steel). The thermal fluid can be formulated from an alkaline organic compound, an inorganic compound, or a combination thereof. Also, the thermal fluid may be used in a diluted form, for example with a concentration ranging from 3 weight percent to 10 weight percent, wherein the concentration is determined based on a weight percent of the non-water contents of the thermal transfer fluid in a total content of the thermal transfer fluid. An embodiment in which the thermal transfer fluid is a combustion gas and comprises liquid water, steam, or a combination thereof and the production fluid comprises liquid water, steam, a thermal fluid, or a combination thereof is specifically mentioned. The thermal transfer fluid may be a product of combustion from a hydrocarbon fuel such as natural gas, propane, or diesel, for example.

Disclosed in FIG. 1 is an embodiment of a fluid heating system with a high efficiency exhaust manifold. Disclosed in FIG. 1 is an exhaust manifold 166 contained within the pressure vessel 150. A heat exchanger 156, which can be a multitubular heat exchanger, for example as can be used in a multitubular fluid firetube heating system is disposed in the pressure vessel 150. Ambient air is forced under pressure by a blower, through a conduit into the combustion furnace 146. In the furnace, a sustained combustion of a combination of fuel and air is maintained, releasing heat energy and combustion gases that travel through the furnace 146, the top tube sheet 152 and into a heat exchanger 156. In an embodiment, and as shown in FIG. 1, the heat exchanger 156 can comprise a plurality of heat exchanger tubes. After traversing the heat exchanger tubes, the hot combustion gases pass through the lower tube sheet 158 and into the exhaust manifold 166 to be conveyed out of the fluid heating system by the exhaust flue (not shown). The exhaust manifold may comprise a first portion 163, which is inside the pressure vessel, and a second portion 162, which is outside the pressure vessel, and the exhaust manifold penetrates the pressure vessel. In an embodiment, as shown in FIG. 1, the exhaust manifold penetrates a side 153 of the pressure vessel.

It is desirable to provide greater bulk heat transfer using less heat transfer surface area contained in a smaller volume. The overall heat transfer equation for a heat exchanger is described by the equation $Q=UA\Delta T_{LM}$ where Q is the heat transfer rate, U is the overall heat transfer coefficient, A is the heat transfer area, and $\Delta T_{LM}$ is the log-mean temperature difference of the fluids on opposite surfaces of the heat exchanger surfaces.

Enhancement of the heat duty of a heat exchanger can be accomplished by increasing the surface area, A; that is, increasing the heat transfer by modifying the geometry of the flow path involve modifying the length of heat exchanger tubes, introducing bends in the flow path, or finding ways to increase the effective surface area per length, such as finned or pinned tube. Alternatively, modification of the turbulent heat transfer boundary layer provides another approach to heat exchanger compactification (hence, fluid heating system compactification) and involves increasing the bulk flow rate and reducing the heat exchanger energy transfer surface area.

However, the techniques for achieving fluid heating system compactification result in shorter combustion gas paths through the heat exchanger and consequently reduce the opportunity for energy recovery from the gas flow before it reaches the exhaust manifold. As a result, means for increasing high overall system thermal efficiency by recovering energy stored in the combustion gas along the exhaust path, in addition to increasing bulk heat transfer in the heat exchanger, are desirable.

Exposing the exterior surface of the exhaust gas manifold to production fluid—either directly or indirectly—provides a means for heat recovery in the manifold. FIG. 1 shows the exhaust gas manifold 166 contained within the pressure vessel 150 and between the bottom head 168 and the bottom tube sheet 158. The interior surface of the exhaust manifold is exposed to hot combustion exhaust gas, while the exterior surface of the first portion of the exhaust manifold is exposed to production fluid entering the pressure vessel in the inlet port 170 and exiting through the exit port 136. As a result, the wall of the first portion of the exhaust manifold supports a temperature differential that promotes energy exchange on all or part of its interior surface when the production fluid temperature is below the dewpoint of the exhaust gas flow.

A feature of a energy efficient exhaust manifold is that by partially or wholly enclosing the manifold inside the pressure vessel containing the production fluid, the heat transfer surface area may be increased resulting in an increase in the thermal energy transferred to the production fluid and a concurrent increase in overall system efficiency.

A second feature is that this increase in thermal efficiency may be achieved while maintaining a reduced unit footprint or other measure of physical compactness.

A third feature is that in certain embodiments the geometrically arranged so that the heat exchanger is not rigidly attached to the pressure vessel along its length. For example, in FIG. 1 the top head 152, heat exchanger tubes 156 and bottom head 158 of the heat exchanger are not rigidly attached to the pressure vessel 150 inner surfaces, allowing thermal expansion of these structures without excessive mechanical stress.

Efficient recovery of energy in the exhaust combustion gas can be achieved in any suitable fluid heating system configuration incorporating an exhaust manifold proximal to a production fluid pressure vessel, and at any suitable orientation. To simplify the presentation, embodiments are shown for fuel-fired, firetube fluid heating systems using tube-and-shell heat exchanger designs. The configuration is not limited to tube-and-shell heat exchanger designs, and thus the configuration selected for description should not be construed as limiting, and adaptation to alternative configurations including firetube systems in any suitable orientation, so long as the gaseous heat transfer (e.g., combustion gas) and production fluids are maintained at significantly different temperatures, and the heat transfer fluid is collected in an exhaust manifold proximal to the production fluid, can be done without undue experimentation.

FIG. 2A illustrates an embodiment of a fuel-fired firetube fluid heating system using a heat exchanger of the tube-and-shell type design in the horizontal orientation. Combustion gas 250 enters the heat exchanger tubes 210 from the furnace 224 through the upper tubesheet. The hot combustion gas 250 passes through the heat exchanger tubes 210 and enter the exhaust manifold 222. As shown in FIG. 2A, in this embodiment the exhaust manifold 222 is contained entirely within the pressure vessel shell 220. A conduit 218 penetrates the pressure vessel shell 220 and connects the outlet 252 of the exhaust manifold 222 to an outside of the pressure vessel shell 220 so that the combustion gases 250 may pass from the heat exchanger 210, through the exhaust manifold 222, and through the conduit 218 to the outside of the pressure vessel shell 220. Production fluid 260 enters the inlet port 212 and is directed out of the pressure vessel through the exit conduit 202. Thus, for what follows, we define a heat exchange manifold to be the structure that conveys thermal transfer fluid from the heat exchanger to the conduit where it penetrates the pressure vessel at the exit port 280 such that the outer surface of the structure is in contact with production fluid. The exit port may be defined by an opening created in the pressure 286 wherein the penetrating conduit may be disposed, for example, by a weld at the exit port 280 point of penetration. Hence the heat exchange manifold possesses the properties that it conveys thermal transfer fluid from the heat exchanger to the conduit that directs it to an outside of the pressure vessel, its outer surfaces are exposed to productions fluid so heat transfer occurs from the thermal transfer fluid to the production fluid, and it is contained within the pressure vessel. The heat exchange manifold is the structure contained within the pressure vessel 220, which may consist of the manifold cavity 222 and any piping that connects the cavity to the heat exchange manifold exit port 280 where it penetrates the pressure vessel 220 such that the outer surfaces are at least partially exposed to production fluid.

FIG. 2B further illustrates the relevant geometry near the exhaust port using a cutaway diagram. The pressure vessel has been extended to encapsulate the primary volume of the exhaust manifold. That is, the pressure vessel encloses the heat exchange manifold. The exterior surface of the manifold wall 234 forms part of the inner pressure vessel and production fluid occupies the space 220 between the outer pressure vessel shell extension 236 and the manifold wall 234. As a result, the exhaust manifold 222 in this embodiment is fully-wetted and pressure retaining.

In this embodiment, the pressure vessel extension is sealed to the manifold at a (for example, welded) joint 280 either directly or incorporating the surface of the exhaust gas exhaust port, as shown. However, the terminus of the pressure vessel extension housing 270 all or part of the manifold need not be rigidly attached (or pinned) to the manifold 222, and is desirably capable of withstanding the fluid pressure capability of all components of the pressure vessel in compliance with national safety standards. So, for example, the terminus 280 of the pressure vessel extension 270 may be made free-floating by incorporating a flexible joint between the extension and the exhaust manifold to add mechanical compliance to the structure.

Figure 2C:
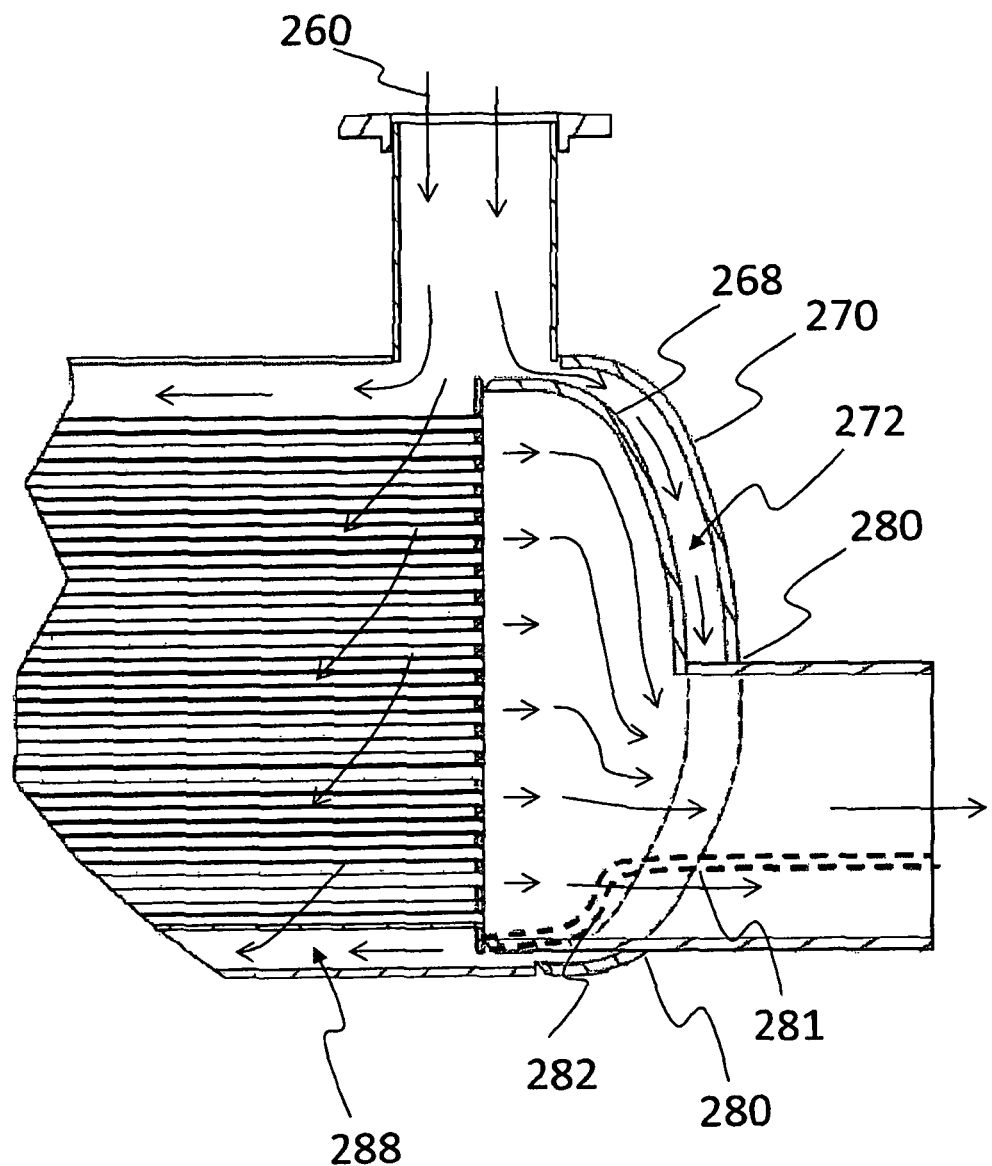
FIG. 2C shows a cross-section diagram of an embodiment of the exhaust gas manifold of the embodiment in a fuel-fired, fire-tube fluid heating system in the horizontal orientation in accordance with embodiments of the present disclosure.

FIG. 2C shows a cross-section of an embodiment highlighting the continuity of production fluid in the pressure vessel 288 and the cavity created by the pressure vessel extension 270 encapsulating the exhaust manifold 268. Production fluid 272 contacts the outer surface of the manifold wall and hot combustion gas exiting the heat exchanger tubes through the lower tubesheet contact of the inner surface of the manifold wall. The temperature difference across the manifold wall promotes energy exchange where the heat released is transferred by conduction to the production fluid, which can be disposed in the region 372 between the exhaust manifold and the pressure vessel shell. The shape of the heat exchange manifold may be selected by those skilled in the art to achieve system requirement for capacity, flow characteristics, and geometry as required by the design, and alternatives shapes are possible and contemplated. (For example, the shape of the connection to the conduit 282 and position of the exit port 281.)

An example implementation in a 6 million BTU/Hr horizontal fuel-fired firetube fluid heating system using a heat exchanger of the tube-and-shell type design in the horizontal orientation was analyzed using a validated computational fluid dynamics (CFD) model for a 6 million BTU/hr case. For this simulation, the geometry of the exhaust gas manifold was modeled with appropriate boundary conditions on the inner surfaces of the manifold walls. A steady-state fluid flow solution was obtained by numerical simulation using temperature and velocity boundary conditions known from both numerical simulations of heat exchanger designs corresponding to the same design case and physical measurements.

For the simulation, the inlet temperature (at lower tubesheet) is 145° F., the Inlet velocity (at lower tubesheet) is 18.26 m/s, the manifold surface area (total) is 1.413 $m^2$, the manifold volume is 65.384 liters and the manifold heat transfer surface area is 0.926 $m^2$.

Figure 3A:
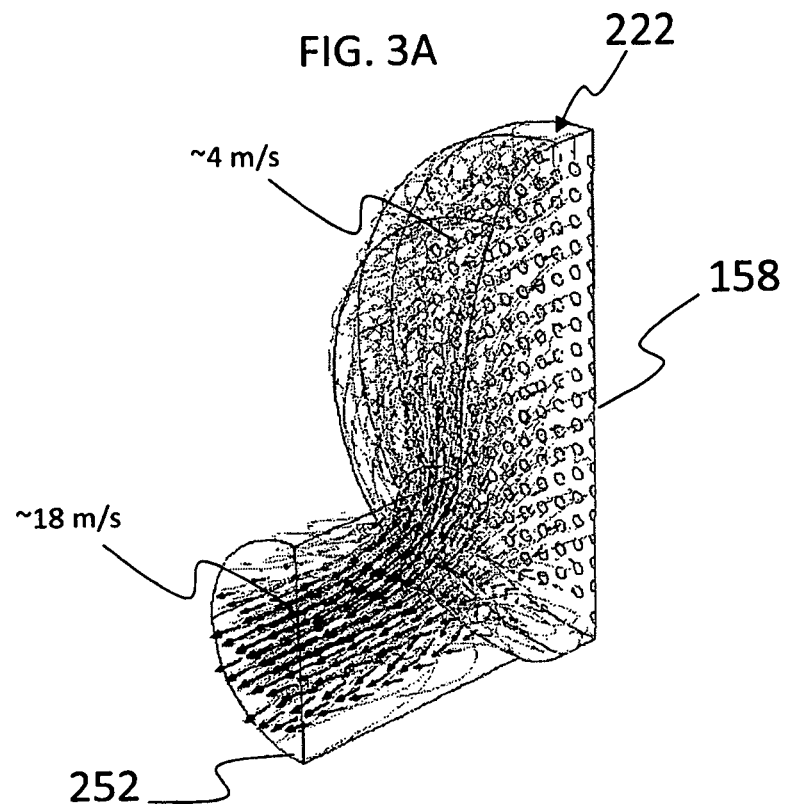
FIG. 3A shows a cutaway diagram of simulated results showing the velocity (meters/second) of the gas flow streamlines in the exhaust gas manifold in the case of a 6 million BTU/hour hydronic fuel-fired, fire-tube fluid heating system in the horizontal orientation in accordance with embodiments of the present disclosure.
Figure 3B:
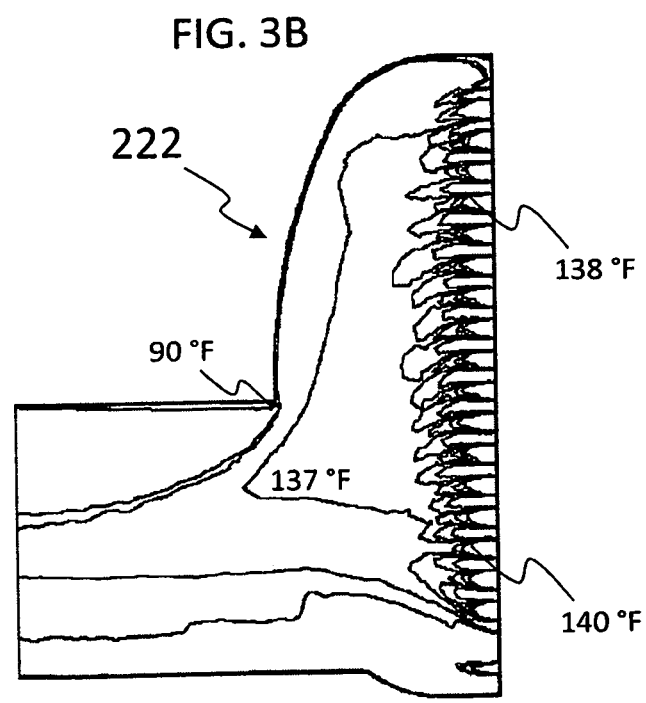
FIG. 3B shows a cutaway diagram of simulated results showing a contour plot of the temperature distribution (degrees Fahrenheit) in the exhaust gas manifold in the case of a 6 million BTU/hour fuel-fired, fire-tube hydronic fluid heating system in the horizontal orientation in accordance with embodiments of the present disclosure.

FIG. 3A shows the gas flow streamline velocity profile for the simulated exhaust manifold. The flowfield is compressed and nearly laminar at the exhaust gas exit. FIG. 3B shows the temperature distribution profile corresponding to the same steady-state solution. As this prophetic example calculation shows, the flow streamlines transition smoothly from the bottom head of the heat exchanger 158 to the end of the conduit 252 without trapped (stationary) flow regions that can lead to heat buildup with smooth acceleration of the flow through the heat exchange manifold.

Using these simulation results, the condensate production and corresponding improvement in energy efficiency due to heat recovery can be calculated using computer computational fluid dynamics techniques. The resulting manifold outlet conditions produced in the simulated example are 129° F. for the outlet temperature and 17° F. for the outlet temperature difference from nominal. Moreover, the condensate production rate for simulation is 7 lb/hr, corresponding to an energy recovery rate that produces an increase in total efficiency of 0.37%, calculated as the difference between the efficiency with condensate recovery and the efficiency without condensate recovery.

Further analysis of the simulated case indicate that this 0.37% energy efficiency improvement is comprised of two components: Approximately 0.22% efficiency improvement is due to latent heat recovery, while the remaining 0.15% is due to sensible heat transfer.

Figure 4A:
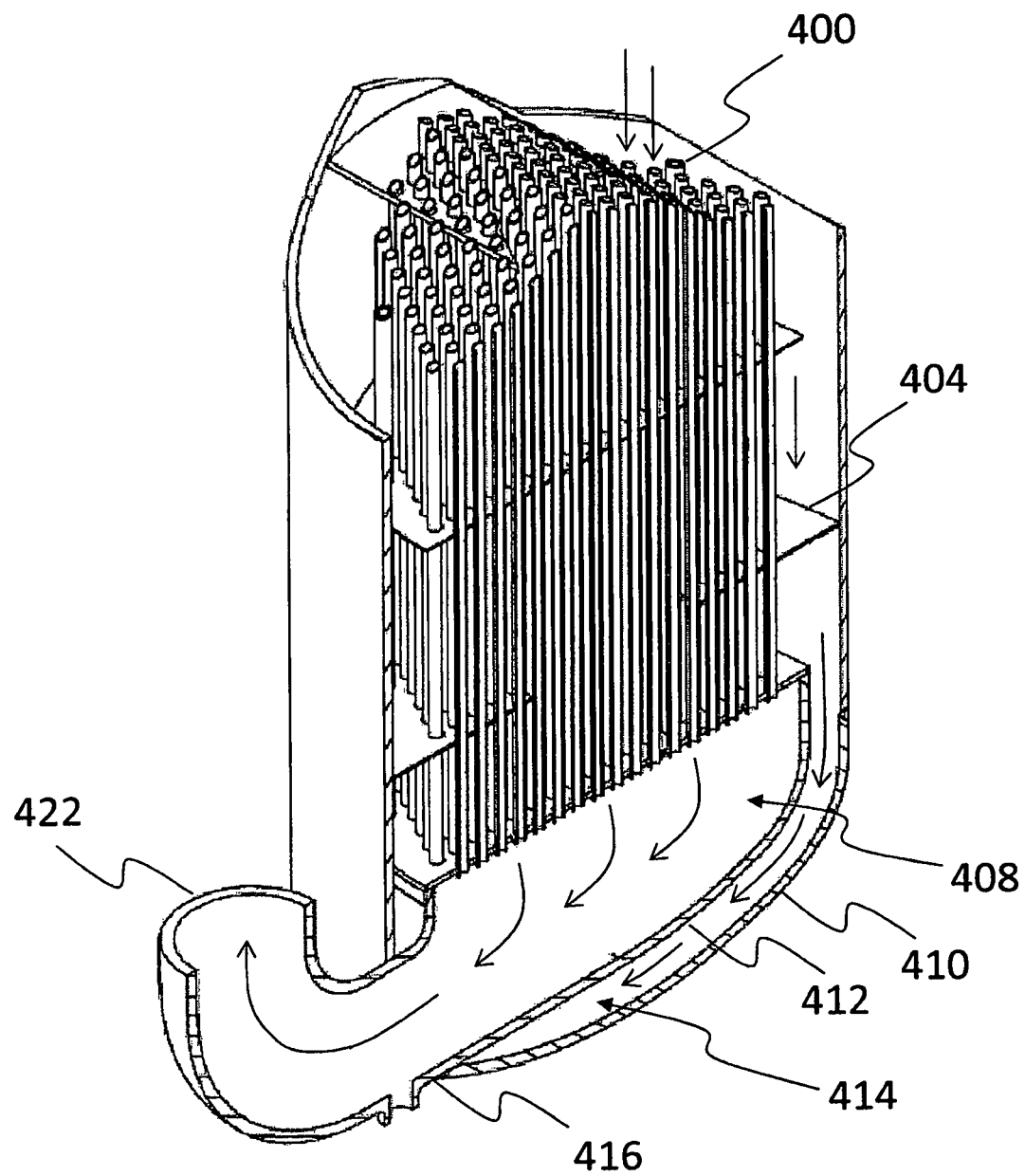
FIG. 4A shows a cutaway diagram of an embodiment of a fuel-fired, fire-tube fluid heating system in the vertical orientation in accordance with embodiments of the present disclosure.

FIG. 4A illustrates another embodiment for a fuel-fired firetube fluid heating system configuration using a heat exchanger of the tube-and-shell type design in the vertical orientation. Combustion gas enters the heat exchanger tubes 400 from the furnace through the upper tubesheet (not shown). The hot combustion gas passes through the heat exchanger tubes, enters the exhaust manifold 408 through inlet 406 and is directed through the an outlet 422 of the exhaust manifold. No external collector volume (e.g., "smoke box") is used to convey the exhaust gases to the flue. Production fluid enters the inlet port (not shown), guided through a series of baffles 404 until it is directed out of the pressure vessel through the exit port (not shown).

In the embodiment of FIG. 4A, the pressure vessel has been extended to encapsulate the primary volume of the exhaust manifold. The exterior surface of the manifold wall 412 forms part of the inner pressure vessel and a production fluid can be disposed to occupy the space 414 between the outer pressure vessel extension 410 and the manifold wall. In this embodiment, the pressure vessel extension is sealed to the manifold at a (typically, welded) joint either directly 416 or incorporating the surface of the exhaust gas exhaust port.

Figure 4B:
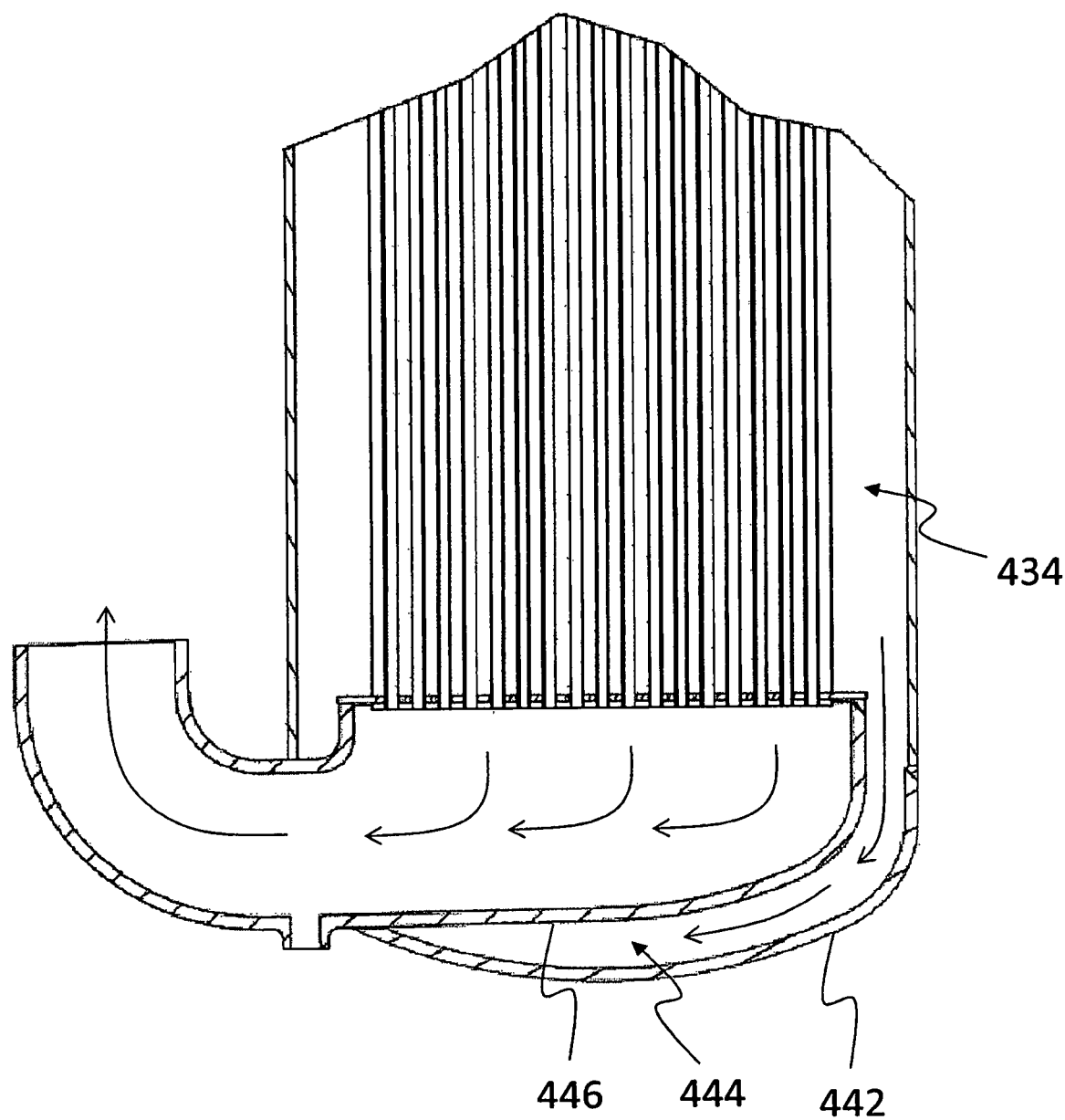
FIG. 4B shows a cross-sectional diagram showing details of an embodiment of the exhaust gas manifold in a fuel-fired, fire-tube fluid heating system in the vertical orientation in accordance with embodiments of the present disclosure.

FIG. 4B shows a cross-section of the embodiment highlighting the continuity of production fluid in the pressure vessel 434 and the cavity created by the pressure vessel extension 442 encapsulating the exhaust manifold 446. Production fluid disposing the space 444 between the exhaust manifold and the pressure vessel shell contacts on the outer surface of the manifold wall, while hot combustion gas exiting the heat exchanger tubes through the lower tubesheet impinges of the inner surface of the manifold wall. The temperature difference across the manifold wall promotes energy recovery where the heat released is transferred by conduction to the production fluid.

In this embodiment a drain 450 is used to flush the accumulated condensate and impurities out of the exhaust manifold in the case of hydronic applications where the production fluid is water. In the hydronic case, condensate absorbs $CO_2$, and becomes mildly acidic (carbonic acid).

Also, the rate of condensate removal directly influences the rate of condensate formation; the film of condensate acts as a thermal insulation layer, slowing the formation of additional condensate. So effective engineered solutions for drainage can have an effect on efficiency.

The design of the exhaust manifold can enhance energy recovery from the combustion gas flow through increased impingement. Where the gas flow exiting the heat exchanger can be sharply turned, combustion gas impinging on the inner surfaces (e.g., bottom wall) of the manifold increases the efficiency of heat conduction. Moreover, surface treatments and structural enhancements may be incorporated into both the inner and outer surfaces of the exhaust manifold wall to enhance energy transfer and, in the hydronic case, promote the flushing of condensate.

For example, the inner (interior) surface of the exhaust manifold may be decorated with ridges or corrugations—or any suitable structure—to increase the surface area and fluid flow turbulence for both heat transfer and condensate formation. Furthermore, these surface structures can be designed to form channels designed to efficiently direct condensate to the drain for expulsion, in the case of hydronic fluid heating systems. Moreover, the outer (exterior) surface of the exhaust manifold may be decorated with corrugations, ridges, fins or vanes—or any equivalent structure—to increase the surface area for heat transfer to the production fluid.

An example implementation in a fired firetube fluid heating system using a heat exchanger of the tube-and-shell type design in the horizontal orientation was analyzed using a computational fluid dynamics (CFD) model for a 3 million BTU/hr case. For this simulation, the geometry of the exhaust gas manifold was modeled with appropriate boundary conditions on the inner surfaces of the manifold walls. A steady-state fluid flow solution was obtained by numerical simulation using temperature and velocity boundary conditions known from both numerical simulations of heat exchanger designs corresponding to the same design case and physical measurements.

In the simulated example, the inlet temperature (at lower tubesheet) is 145° F., the inlet velocity (at lower tubesheet) is 15.04 m/s, the manifold surface area (total) is 0.783 $m^2$, the manifold volume is 44.114 liters and the manifold heat transfer surface area 0.751 $m^2$.

Figure 5A:
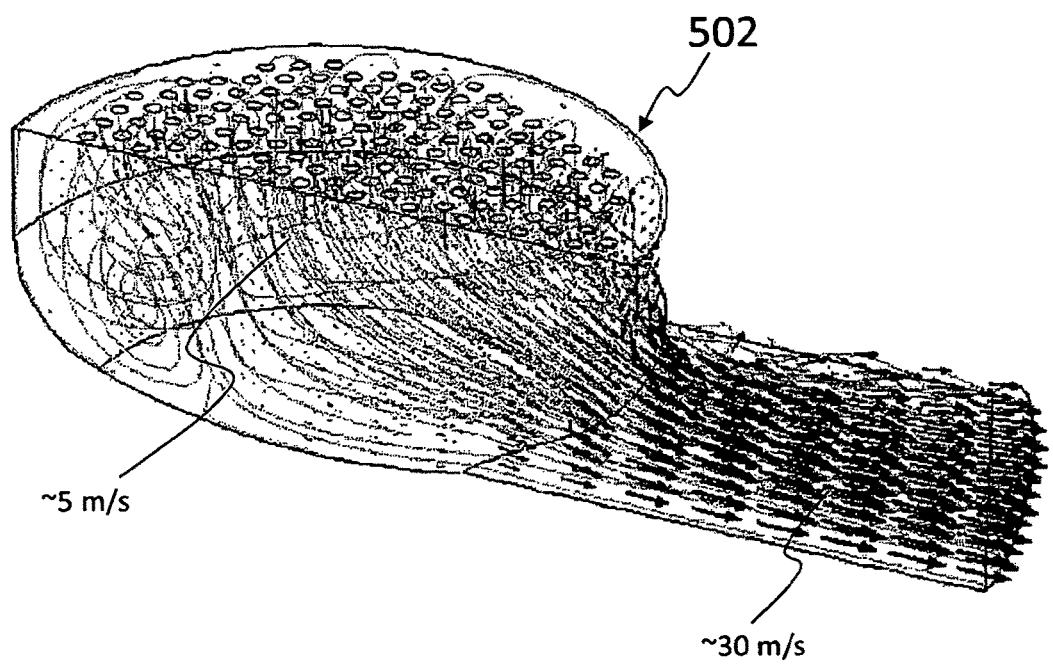
FIG. 5A shows a cutaway diagram for simulated results showing the velocity (meters/second) of the gas flow streamlines in the exhaust gas manifold in the case of a 3 million BTU/hour fuel-fired, fire-tube hydronic fluid heating system in the vertical orientation in accordance with embodiments of the present disclosure.
Figure 5B:
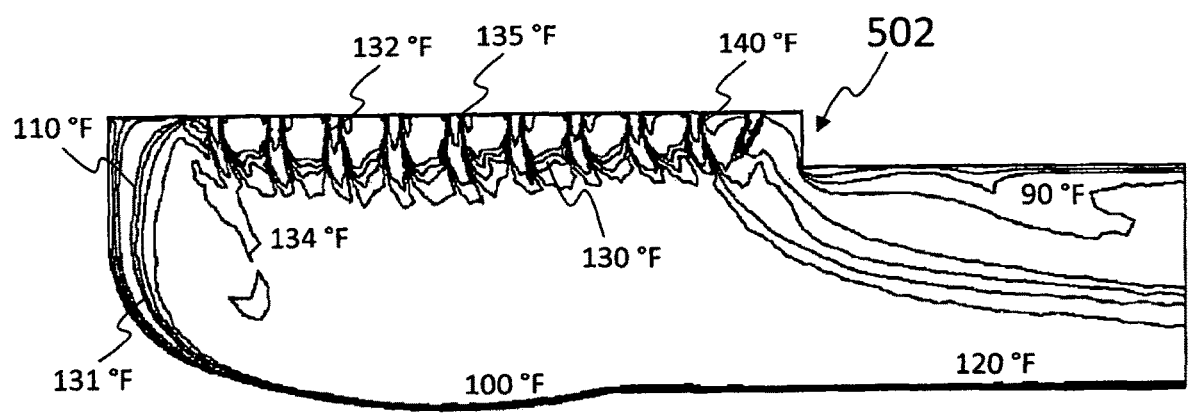
FIG. 5B shows a cutaway diagram for simulated results showing a contour plot of the temperature distribution (degrees Fahrenheit) in the exhaust gas manifold in the case of a 3 million BTU/hour fuel-fired, fire-tube hydronic fluid heating system in the vertical orientation in accordance with embodiments of the present disclosure.

FIG. 5A shows the gas flow streamline velocity profile 502 for the simulated exhaust manifold. The flow field is compressed and nearly laminar at the exhaust gas exit. FIG. 5B shows the temperature distribution profile corresponding to the same steady-state solution. The 3 million BTU/Hr example shows higher efficiency gain than the 6 million BUT/Hr case due to higher impingement of the flow on the manifold surface. Since the flow is turned 90 degrees in this configuration, the flow impinges directly (and hard) on manifold bottom to be turned 90 degrees.

Using these simulation results, the condensate production and corresponding improvement in energy efficiency due to heat recovery can be estimated. The significant outlet temperature drop (16° F.) is due to sensible heat recovery, highlighting the fact that the present invention has utility for applications other than hydronic fluid heating systems. The simulated manifold outlet conditions produced are 129° F. for the outlet temperature and 16° F. for the outlet temperature difference from nominal. The resulting condensate production rate for simulation is 3 lb/hr, corresponding to an energy recovery rate that produces an increase in total efficiency of 0.5%.

Further analysis of the simulated case indicate that this 0.5% energy efficiency improvement is comprised of two components: Approximately 0.3% efficiency improvement is due to latent heat recovery, while the remaining 0.2% is due to sensible heat transfer.

The thermal efficiency gains illustrated in the above embodiments are realized by partially or completely encapsulating the exhaust manifold into the production fluid pressure vessel and utilizing the resulting temperature difference across the manifold wall to promote energy recovery. In the foregoing embodiment, the pressure vessel extension can be joined to the manifold or the exhaust port by a rigid joint (e.g., weld).

Figure 6:
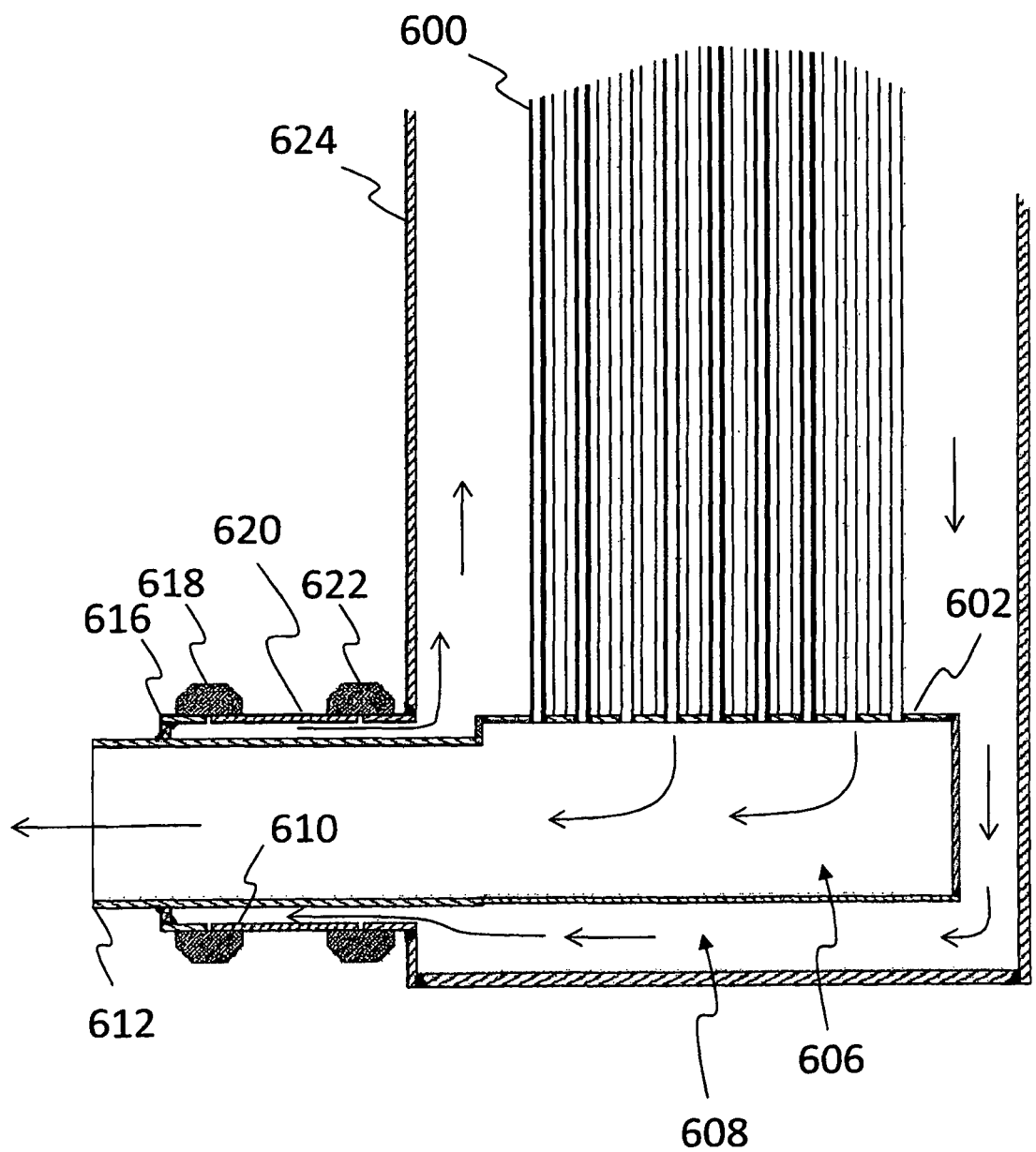
FIG. 6 shows a cutaway diagram of an embodiment of a fuel-fired, fire-tube fluid heating system in the vertical orientation incorporating a compliant element in accordance with embodiments of the present disclosure.

In the embodiment shown in FIG. 6, since the manifold is contained within the pressure vessel and the heat exchanger bottom head 602 is not rigidly attached to the pressure vessel 624, thermal stress that results from the expansion of the heat exchanger can be designed to occur at a specific location on the pressure vessel surface where it can be effectively relieved. For example, the pressure vessel extension can be arranged to terminate on the exhaust manifold and/or combustion gas exhaust port where stress can be relieved using an expansion joint. Hot combustion gases flow through the heat exchanger tubes 600, past the lower tube sheet 602, into the exhaust gas manifold 606 and are directed laterally through the outlet of the exhaust manifold 612. Two compressive seal expansion joints are attached to the exterior pressure vessel surface of the exhaust port; the inner 622 and outer 618 compressive seal expansion joints are separated by a floating pipe segment 620. The compressive seals are secured using retaining ring housings.

The combination of the pressure vessel flange 610, the floating pipe section, the combustion gas exhaust port flange 616 and the exhaust conduit where it exits the exhaust port flange forms part of the exterior pressure vessel as a continuation of the pressure vessel shell 624. Production fluid, under pressure, occupies the space 608 between the articulated assembly and the exhaust gas manifold. The temperature difference across the exhaust manifold wall due to the production fluid and the manifold gas flow results in recovered energy that is transferred into the production fluid contributing to an increase in the overall system thermal efficiency. Thus, the heat exchange manifold is mechanically decoupled from the shell through a compliant member. Other techniques for introducing the decoupling and compliance may be used, such as described in U.S. patent application Ser. No. 15/217,243 and PCT Application PCT/US2016/043861.

The various components of the exhaust manifold and pressure vessel can each independently comprise any suitable material. Use of a metal is specifically mentioned. Representative metals include iron, aluminum, magnesium, titanium, nickel, cobalt, zinc, silver, copper, and an alloy comprising at least one of the foregoing. Representative metals include carbon steel, mild steel, cast iron, wrought iron, a stainless steel such as a 300 series stainless steel or a 400 series stainless steel, e.g., 304, 316, or 439 stainless steel, Monel, Inconel, bronze, and brass. Specifically mentioned is an embodiment in which the exhaust manifold and the pressure vessel each comprise steel, specifically stainless steel. The fluid heating system may comprise a pressure vessel shell, a heat exchanger, an upper tube sheet, a lower tube sheet, and an exhaust manifold, and the pressure vessel shell, heat exchanger, the upper tube sheet, the lower tube sheet, and the exhaust manifold can each independently comprise any suitable material. Use of a steel, such as mild steel or stainless steel this mentioned. While not wanting to be bound by theory, it is understood that use of stainless steel in the dynamic components can help to keep the components below their respective fatigue limits, potentially eliminating fatigue failure as a failure mechanism, and promote efficient heat exchange.

The disclosed compliant heating can provide one for more of the following benefits. First, mechanical stress that arises due to the differential thermal expansion of some of the components can be localized to one or more specific locations of the compressive seal expansion joint. Second, the compressive seal expansion joint can be located on an external component of the compliant heating system, such as a pressure vessel shell or on a conduit allowing for easy access for inspection and/or service. Third, in the disclosed configuration, the compressive seal expansion joint can be inspected and/or serviced without welding or specialized techniques or tooling.

An example of a compliant heating system is a boiler, for example, for the production of hot thermal fluids (such as steam, hot water, non-water based fluids, or a combination comprising one or more of the foregoing). The hot thermal fluids can be used for ambient temperature regulation or water heating. The compliant heating system can be used for domestic, commercial, or industrial applications. In the compliant heating system, the thermally-induced mechanical stress can be localized to replaceable, compliant elements on the exterior pressure vessel to provide improved reliability.

The disclosed system can alternately comprise, consist of, or consist essentially of, any appropriate components herein disclosed. The disclosed system can additionally be substantially free of any components or materials used in the prior art that are not necessary to the achievement of the function and/or objectives of the present disclosure.

The terms "a" and "an" do not denote a limitation of quantity, but rather denote the presence of at least one of the referenced item. The term "or" means "and/or" unless clearly indicated otherwise by context. Reference throughout the specification to "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments. "Optional" or "optionally" means that the subsequently described event or circumstance may or may not occur, and that the description includes instances where the event occurs and instances where it does not. The terms "first," "second," and the like, "primary," "secondary," and the like, as used herein do not denote any order, quantity, or importance, but rather are used to distinguish one element from another. The terms "front", "back", "bottom", and/or "top" are used herein, unless otherwise noted, merely for convenience of description, and are not limited to any one position or spatial orientation.

The endpoints of all ranges directed to the same component or property are inclusive of the endpoints, are independently combinable, and include all intermediate points. For example, ranges of "up to 25 N/m, or more specifically 5 to 20 N/m" are inclusive of the endpoints and all intermediate values of the ranges of "5 to 25 N/m," such as 10 to 23 N/m.

Unless defined otherwise, technical and scientific terms used herein have the same meaning as is commonly understood by one of skill in the art to which this invention belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

Disclosed is a fluid heating system comprising: a pressure vessel shell comprising a first inlet; a heat exchanger disposed in the pressure vessel shell, the heat exchanger comprising a second inlet and a second outlet, wherein the second inlet of the heat exchanger is connected to the first inlet of the pressure vessel shell; and an exhaust manifold disposed in the pressure vessel shell, the exhaust manifold comprising a third inlet and a third outlet, wherein the third inlet of the exhaust manifold is connected to the second outlet of the heat exchanger, wherein the third outlet of the exhaust manifold is outside of the pressure vessel shell, and wherein the exhaust manifold penetrates the pressure vessel shell.

Also disclosed is a fluid heating system comprising: a pressure vessel shell comprising a first inlet; a heat exchanger disposed in the pressure vessel shell, the heat exchanger comprising a second inlet and a second outlet, wherein the second inlet of the heat exchanger is connected to the first inlet of the pressure vessel shell; an exhaust manifold disposed in the pressure vessel shell, the exhaust manifold comprising a third inlet and a third outlet, wherein the third inlet of the exhaust manifold is connected to the second outlet of the heat exchanger; and a conduit, which connects the third outlet of the exhaust manifold to an outside of the pressure vessel shell, and wherein the conduit penetrates the pressure vessel shell.

Also disclosed is a method of heat transfer, the method comprising: providing a fluid heating system comprising a pressure vessel shell comprising a first inlet, a heat exchanger disposed in the pressure vessel shell, the heat exchanger comprising a second inlet and a second outlet, wherein the second inlet of the heat exchanger is connected to the first inlet of the pressure vessel shell, and an exhaust manifold disposed in the pressure vessel shell, the exhaust manifold comprising a third inlet and a third outlet, wherein the third inlet of the exhaust manifold is connected to the second outlet of the heat exchanger, wherein the third outlet of the exhaust manifold is outside of the pressure vessel shell, and wherein the exhaust manifold penetrates the pressure vessel shell; and disposing a thermal transfer fluid in the heat exchanger and exhaust manifold and a production fluid in the pressure vessel shell to transfer heat from the thermal transfer fluid to the production fluid.

Also disclosed is a method of heat transfer, the method comprising: providing a fluid heating system comprising a pressure vessel shell comprising a first inlet, a heat exchanger disposed in the pressure vessel shell, the heat exchanger comprising a second inlet and a second outlet, wherein the second inlet of the heat exchanger is connected to the first inlet of the pressure vessel shell, an exhaust manifold disposed in the pressure vessel shell, the exhaust manifold comprising a third inlet and a third outlet, wherein the third inlet of the exhaust manifold is connected to the second outlet of the heat exchanger, and a conduit, which connects the third outlet of the exhaust manifold to an outside of the pressure vessel shell, and wherein the conduit penetrates the pressure vessel shell; disposing a thermal transfer fluid in the heat exchanger and exhaust manifold and a production fluid in the pressure vessel shell to transfer heat from the thermal transfer fluid to the production fluid.

Also disclosed is a method of manufacturing a fluid heating system, the method comprising: providing a pressure vessel shell comprising a first inlet; disposing a heat exchanger in the pressure vessel shell, the heat exchanger comprising a second inlet and a second outlet; and disposing an exhaust manifold in the pressure vessel shell, the exhaust manifold comprising a third inlet and a third outlet to provide the fluid heating system.

Also disclosed is a method of manufacturing a fluid heating system, the method comprising: providing a pressure vessel shell comprising a first inlet; disposing a heat exchanger in the pressure vessel shell, the heat exchanger comprising a second inlet and a second outlet; disposing an exhaust manifold in the pressure vessel shell, the exhaust manifold comprising a third inlet and a third outlet; connecting the second inlet of the heat exchanger to a conduit, which penetrates an the pressure vessel shell; connecting the second outlet of the heat exchanger to a first end of a conduit, and a second end of the conduit to the exhaust manifold to provide the fluid heating system.

Also disclosed is a fluid heating system comprising: a pressure vessel shell comprising a first inlet and first outlet, a cylindrical shell, a first top head and a first bottom head, wherein the cylindrical shell is disposed between the first top head and the first bottom head, and wherein the first inlet and the first outlet are each independently on the cylindrical shell, the first top head, or the first bottom head; a heat exchanger disposed in the pressure vessel shell; an outlet member connecting the second outlet to an exhaust flue which is disposed on an outside of the pressure vessel shell; a conduit, which penetrates the pressure vessel shell, wherein a first end of the conduit is connected to the second inlet and wherein a second end of the conduit is on the outside of the pressure vessel shell.

Also disclosed is a method of manufacturing a fluid heating system, the method comprising: providing a pressure vessel shell comprising a first inlet; disposing a heat exchanger in the pressure vessel shell, the heat exchanger comprising a second inlet and a second outlet; and disposing an exhaust manifold in the pressure vessel shell, the exhaust manifold comprising a third inlet and a third outlet to provide the fluid heating system.

Also disclosed is a method of manufacturing a fluid heating system, the method comprising: providing a pressure vessel shell comprising a first inlet; disposing a heat exchanger in the pressure vessel shell, the heat exchanger comprising a second inlet and a second outlet; disposing an exhaust manifold in the pressure vessel shell, the exhaust manifold comprising a third inlet and a third outlet; connecting the second inlet of the heat exchanger to a conduit, which penetrates an the pressure vessel shell; connecting the second outlet of the heat exchanger to a first end of a conduit, and a second end of the conduit to the exhaust manifold to provide the fluid heating system.

Also disclosed is a fluid heating system embodiment comprising: a pressure vessel shell comprising a first inlet and first outlet, a cylindrical shell, a first top head and a first bottom head, wherein the cylindrical shell is disposed between the first top head and the first bottom head, and wherein the first inlet and the first outlet are each independently on the cylindrical shell, the first top head, or the first bottom head; a heat exchanger disposed in the pressure vessel shell; an outlet member connecting the second outlet to an exhaust flue which is disposed on an outside of the pressure vessel shell; a conduit, which penetrates the pressure vessel shell, wherein a first end of the conduit is connected to the second inlet and wherein a second end of the conduit is on the outside of the pressure vessel shell.

A method of heat transfer, the method comprising: providing a fluid heating system comprising a pressure vessel shell comprising a first inlet, a heat exchanger disposed in the pressure vessel shell, the heat exchanger comprising a second inlet and a second outlet, wherein the second inlet of the heat exchanger is connected to the first inlet of the pressure vessel shell, an exhaust manifold disposed in the pressure vessel shell, the exhaust manifold comprising a third inlet and a third outlet, wherein the third inlet of the exhaust manifold is connected to the second outlet of the heat exchanger, and a conduit, which connects the third outlet of the exhaust manifold to an outside of the pressure vessel shell, and wherein the conduit penetrates the pressure vessel shell; disposing a thermal transfer fluid in the heat exchanger and exhaust manifold and a production fluid in the pressure vessel shell to transfer heat from the thermal transfer fluid to the production fluid. This method of heat transfer may further comprise directing a production fluid through the first inlet to provide a flow of the production fluid through the pressure vessel shell, and directing a thermal transfer fluid from the second inlet to the third outlet to provide a flow of the thermal transfer fluid through the heat exchanger and the exhaust manifold.

In the foregoing embodiments, the pressure vessel shell may be configured to contain a production fluid such that an outer surface of the exhaust manifold is contacted by the production fluid; and/or the exhaust manifold may comprises a first portion, which is disposed inside the pressure vessel shell, and a second portion, which is disposed outside of the pressure vessel shell, and the pressure vessel shell may be configured to contain a production fluid such that an entirety of an outer surface of the first portion of the exhaust manifold is contacted by the production fluid; and/or the exhaust manifold may penetrate a side of the pressure vessel shell; and/or the side of the pressure vessel shell may be orthogonal to the third inlet of the exhaust manifold; and/or the third outlet of the exhaust manifold may be parallel to the third inlet of the exhaust manifold; and/or the first portion and the second portion of the exhaust manifold may each comprise a bend; and/or the exhaust manifold may penetrate an end of the pressure vessel shell; and/or the end of the pressure vessel shell may be opposite the first inlet of the pressure vessel shell; and/or a surface area of the first portion of the exhaust manifold may be greater than a surface area of the second portion of the exhaust manifold; and/or the exhaust manifold may further comprises a drain, which is disposed on the second portion of the exhaust manifold; and/or an entirety of the first portion of the exhaust manifold may be disposed entirely in the pressure vessel shell; and/or a fluid heating system may further comprise a production fluid which is disposed in the pressure vessel shell and which contacts an outside of the first portion exhaust manifold, and a thermal transfer fluid which is disposed in the exhaust manifold, wherein the production fluid and the thermal transfer fluid each independently comprise a liquid, a gas, or a combination thereof; and/or the production fluid and the thermal transfer fluid may each independently comprise water, a substituted or unsubstituted C1 to C30 hydrocarbon, air, carbon dioxide, carbon monoxide, or a combination thereof; and/or the production fluid may comprise liquid water, steam, a thermal fluid, a glycol, or a combination thereof; and/or the method may further comprise directing a production fluid through the first inlet to provide a flow of the production fluid through the pressure vessel shell, and directing a thermal transfer fluid from the second inlet to the third outlet to provide a flow of the thermal transfer fluid through the heat exchanger and the exhaust manifold.

What is claimed is:

1. A fluid heating system comprising:
   a pressure vessel shell comprising a vessel inlet configured to receive production fluid;
   a heat exchanger (Hx) disposed in the pressure vessel shell and configured to receive thermal transfer fluid, the heat exchanger comprising an Hx inlet and an Hx outlet, wherein the Hx inlet is connected to the vessel inlet;
   an exhaust manifold disposed within the pressure vessel shell, configured to receive the thermal transfer fluid from the heat exchanger, the exhaust manifold comprising a manifold inlet and a manifold outlet, wherein the manifold inlet of the exhaust manifold is fluidically connected to the Hx outlet, wherein the manifold outlet is outside of the pressure vessel shell, and wherein the exhaust manifold penetrates the pressure vessel shell;
   the heat exchanger and the exhaust manifold configured to efficiently transfer heat from the thermal transfer fluid to the production fluid; and
   wherein the shape of the exhaust manifold disposed within the pressure vessel shell is configured to (i) direct at least a portion of the thermal transfer fluid flow impinging on an inner surface of the manifold to turn, causing the flow to promote the efficient heat transfer from the thermal transfer fluid to the production fluid, and (ii) to avoid regions of low-velocity flow in the exhaust manifold.

2. The fluid heating system of claim 1, wherein the pressure vessel shell is configured to contain the production fluid such that an outer surface of the exhaust manifold is contacted by the production fluid.

3. The fluid heating system of claim 1, wherein the exhaust manifold comprises a first portion, which is disposed inside the pressure vessel shell, and a second portion, which is disposed outside of the pressure vessel shell, and
   wherein the pressure vessel shell is configured to contain the production fluid such that an entirety of an outer surface of the first portion of the exhaust manifold is contacted by the production fluid.

4. The fluid heating system of claim 1, wherein the exhaust manifold penetrates a side of the pressure vessel shell.

5. The fluid heating system of claim 1, wherein a side of the pressure vessel shell is orthogonal to the manifold inlet.

6. The fluid heating system of claim 1, wherein the manifold outlet is parallel to the manifold inlet.

7. The fluid heating system of claim 1, wherein the first portion and the second portion of the exhaust manifold each comprise a bend.

8. The fluid heating system of claim 1, wherein the exhaust manifold penetrates an end of the pressure vessel shell.

9. The fluid heating system of claim 8, wherein the end of the pressure vessel shell is opposite the vessel inlet.

10. The fluid heating system of claim 3, wherein a surface area of the first portion of the exhaust manifold is greater than a surface area of the second portion of the exhaust manifold.

11. The fluid heating system of claim 3, wherein the exhaust manifold further comprises a drain, which is disposed on the second portion of the exhaust manifold.

12. The fluid heating system of claim 3, wherein an entirety of the first portion of the exhaust manifold is disposed entirely in the pressure vessel shell.

13. The fluid heating system of claim 3, wherein the production fluid in the pressure vessel shell contacts an outside of the first portion of the exhaust manifold, and the thermal transfer fluid is disposed in the exhaust manifold, and wherein the production fluid and the thermal transfer fluid each independently comprise a liquid, a gas, or a combination thereof.

14. The fluid heating system of claim 1, wherein the exhaust manifold is mechanically decoupled from the vessel shell through a compliant member.

15. The fluid heating system of claim 14, wherein the compliant member comprises a compressive seal expansion joint.

16. The fluid heating system of claim 14, wherein the compliant member comprises two compressive seal expansion joints.

17. The fluid heating system of claim 1, wherein the vessel inlet and the manifold are arranged to cause production fluid to flow across an outer surface of the manifold within the pressure vessel to efficiently transfer heat from the thermal transfer fluid in the manifold to the production fluid.

18. A fluid heating system comprising:
   a pressure vessel shell comprising a vessel inlet configured to receive production fluid;
   a heat exchanger (Hx) disposed in the pressure vessel shell and configured to receive thermal transfer fluid, the heat exchanger comprising an Hx inlet and Hx outlet, wherein the Hx inlet is connected to the vessel inlet;
   an exhaust manifold disposed in the pressure vessel shell, the exhaust manifold comprising a manifold inlet and a manifold outlet, wherein the manifold inlet is fluidically connected to the Hx outlet;
   a conduit, which connects the manifold outlet to an outside of the pressure vessel shell, and wherein the conduit penetrates the pressure vessel shell;
   the heat exchanger and the exhaust manifold configured to efficiently transfer heat from the thermal transfer fluid to the production fluid; and
   wherein the shape of the exhaust manifold disposed within the pressure vessel shell is configured to (i) direct at least a portion of the thermal transfer fluid flow impinging on an inner surface of the manifold to turn, causing the flow to promote the efficient heat transfer from the thermal transfer fluid to the production fluid, and (ii) to avoid regions of low-velocity flow in the exhaust manifold.

19. The fluid heating system of claim 18, wherein the production fluid contacts and flows across an outer surface of the manifold within the pressure vessel to efficiently transfer heat from the thermal transfer fluid in the manifold to the production fluid.

20. The fluid heating system of claim 18, wherein the exhaust manifold comprises a first portion, which is disposed inside the pressure vessel shell, and a second portion, which is disposed outside of the pressure vessel shell, and wherein the pressure vessel shell is configured to contain the production fluid such that an entirety of an outer surface of the first portion of the exhaust manifold is contacted by the production fluid.

21. A method of heat transfer, the method comprising:
   providing a fluid heating system comprising:
      a pressure vessel shell comprising a vessel inlet,
      a heat exchanger (Hx) disposed in the pressure vessel shell, the heat exchanger comprising an Hx inlet and an Hx outlet, wherein the Hx inlet is connected to the vessel inlet, and an exhaust manifold disposed in the pressure vessel shell, the exhaust manifold comprising a manifold inlet and a manifold outlet, wherein the manifold inlet is connected to the Hx outlet, wherein the manifold outlet is outside of the pressure vessel shell, and wherein the exhaust manifold penetrates the pressure vessel shell;

disposing a thermal transfer fluid in the heat exchanger and exhaust manifold and a production fluid in the pressure vessel shell to efficiently transfer heat from the thermal transfer fluid in the heat exchanger and the exhaust manifold to the production fluid; and wherein the shape of the exhaust manifold disposed within the pressure vessel shell is configured to (i) direct at least a portion of the thermal transfer fluid flow impinging on an inner surface of the manifold to turn, causing the flow to promote the efficient heat transfer from the thermal transfer fluid to the production fluid, and (ii) to avoid regions of low-velocity flow in the exhaust manifold.

22. The method of claim 21, wherein the method further comprises directing the production fluid through the vessel inlet to provide a flow of the production fluid through the pressure vessel shell, and directing the thermal transfer fluid from the Hx inlet to the manifold outlet to provide a flow of the thermal transfer fluid through the heat exchanger and the exhaust manifold.

23. The method claim 21, wherein the exhaust manifold is mechanically decoupled from the vessel shell through a compliant member.

24. The method of claim 21, further comprising flowing the production fluid across an outer surface of the manifold within the pressure vessel to efficiently transfer heat from the thermal transfer fluid in the manifold to the production fluid.

25. The method of claim 21, wherein the exhaust manifold comprises a first portion, which is disposed inside the pressure vessel shell, and a second portion, which is disposed outside of the pressure vessel shell, and wherein the pressure vessel shell is configured to contain the production fluid such that an entirety of an outer surface of the first portion of the exhaust manifold is contacted by the production fluid.

* * * * *